United States Patent
Banik et al.

(10) Patent No.: US 10,659,100 B2
(45) Date of Patent: May 19, 2020

(54) CHANNEL HOPPING BASED ON CHANNEL PERFORMANCE STATISTICS

(71) Applicant: Texas Instruments Incorporated, Dallas, TX (US)

(72) Inventors: Jyotirmoy Banik, Dallas, TX (US); Il Han Kim, Frisco, TX (US); Jianwei Zhou, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/137,456

(22) Filed: Sep. 20, 2018

(65) Prior Publication Data

US 2019/0097679 A1  Mar. 28, 2019

Related U.S. Application Data

(60) Provisional application No. 62/561,710, filed on Sep. 22, 2017.

(51) Int. Cl.
  *H04B 1/00*  (2006.01)
  *H04B 1/7143*  (2011.01)

(52) U.S. Cl.
  CPC .................. *H04B 1/7143* (2013.01)

(58) Field of Classification Search
  CPC .............................. H04B 1/7143; H04B 1/713
  USPC ........................................................ 375/133
  See application file for complete search history.

(56) References Cited

U.S. PATENT DOCUMENTS

| | | | |
|---|---|---|---|
| 9,614,579 B2 | 4/2017 | Shih et al. | |
| 2009/0196249 A1* | 8/2009 | Kawamura | H04B 1/7143 370/330 |
| 2009/0238241 A1* | 9/2009 | Hooli | H04B 1/7143 375/133 |
| 2011/0007779 A1* | 1/2011 | Nanri | H04B 1/715 375/133 |
| 2014/0036859 A1* | 2/2014 | Ekpenyong | H04W 72/042 370/330 |
| 2016/0323874 A1* | 11/2016 | Pajukoski | H04L 5/001 |

(Continued)

OTHER PUBLICATIONS

Min Song et al., "Frequency Hopping Pattern Recognition Algorithm for Wireless Sensor Network", 2005, Department of Electrical and Computer Engineer, Old Dominion University, 6 pages.*

(Continued)

*Primary Examiner* — Tesfaldet Bocure
(74) *Attorney, Agent, or Firm* — Michael A. Davis Jr.; Charles A. Brill; Frank D. Cimino

(57) ABSTRACT

A method of generating a channel hopping sequence for a link in a wireless sensor network is provided that includes receiving performance quality data for respective frequency channels of a plurality of frequency channels in the link in a monitoring system, determining a channel quality indicator (CQI) by the monitoring system for each frequency channel based on the respective performance quality data, and determining a repetition factor by the monitoring system for each frequency channel based on the respective CQI, wherein a repetition factor for a frequency channel indicates a number of times the frequency channel is repeated in the channel hopping sequence.

20 Claims, 4 Drawing Sheets

(56) References Cited

U.S. PATENT DOCUMENTS

2019/0222255 A1* 7/2019 Nammi ................. H04B 1/713

OTHER PUBLICATIONS

Peng Do et al., "Adaptive Channel Hopping for Wireless Sensor Network", Oct. 2011, International Conference on Selected Topic in Mobile & wireless Networking, pp. 19-23.*

Suk-Un Yoon et al, "Adaptive Channel Hopping for Interference Robust Wireless Sensor Networks", 2010 IEEE International Conference on Communications, May 23-27, 2010, Cape Town, South Africa, pp. 1-5.

CC2650 SimpleLink Multistandard Wireless MCU, SWRS158B, Texas Instruments, Inc., Feb. 2015, revised Jul. 2015, pp. 1-64.

Erlantz Fernandez De Gorostiza et al, "A Method for Dynamically Selecting the Best Frequency Hopping Technique in Industrial Wireless Sensor Network Applications", Sensors, Feb. 23, 2018, vol. 18(2), pp. 1-34.

"IEEE Standard for Low-Rate Wireless Personal Area Networks (WPANs)", IEEE Standards Association, IEEE Std 802.15.4-2015 (Revision of IEEE Std 802.15.4-2011), Dec. 5, 2015, pp. 1-709.

Luca Stabellini and Mohammad Mohsen Parhizkar, "Experimental Comparison of Frequency Hopping Techniques for 802.15.4-based Sensor Networks", UBICOMM 2010:The Fourth International Conference on Mobile Ubiquitous Computing, Systems, Services and Technologies, Oct. 25-30, 2010, pp. 110-116.

Thomas Watteyne et al, "Reliability Through Frequency Diversity: Why Channel Hopping Makes Sense", Proceedings of the 6th ACM Symposium on Performance Evaluation of Wireless Ad Hoc, Sensor, and Ubiquitous Networks, Oct. 28, 2009, pp. 116-123.

* cited by examiner

| CHANNEL RESPONSE | 0.52 | 0.58 | 0.46 | 0.27 | 0.40 | 0.46 | 0.44 | 0.96 | 1.00 | 0.05 | 0.32 | 0.24 | 0.02 | 0.04 | 0.07 | 0.38 |
|---|---|---|---|---|---|---|---|---|---|---|---|---|---|---|---|---|
| CHANNEL NUMBER | 0 | 1 | 2 | 3 | 4 | 5 | 6 | 7 | 8 | 9 | 10 | 11 | 12 | 13 | 14 | 15 |

CHANNEL HOPPING BASED ON CHANNEL PERFORMANCE STATISTICS

CROSS-REFERENCE TO RELATED APPLICATIONS

This application claims benefit of U.S. Provisional Patent Application Ser. No. 62/561,710, filed Sep. 22, 2017, which is incorporated herein by reference in its entirety.

BACKGROUND

The radio environment in a wireless sensor network is time varying and difficult to predict which increases the risk of depending on a single frequency channel for communication, especially in a harsh industrial environment. For this reason, standard protocols used in the Industrial Internet of Things (IIoT), e.g., WirelessHART and IEEE 802.15.4-2015 timeslotted channel hopping (TSCH), employ channel hopping across different radio frequency channels to mitigate the effects of communication impairments such as narrow band interference and multipath fading.

In general, channel hopping relies on time synchronization to ensure that a transmitting node and the receiving node operate on the same frequency channel. One variant of channel hopping that is commonly used relies on blacklisting of unreliable channels based on node statistics. In this variant, channel hopping is performed using the non-blacklisted channels, referred to as the whitelist.

SUMMARY

Embodiments relate to methods and apparatus for channel hopping based on channel statistics. In one aspect, a method of generating a channel hopping sequence for a link in a wireless sensor network is provided that includes receiving performance quality data for respective frequency channels of a plurality of frequency channels in the link in a monitoring system, determining a channel quality indicator (CQI) by the monitoring system for each frequency channel based on the respective performance quality data, and determining a repetition factor by the monitoring system for each frequency channel based on the respective CQI, wherein a repetition factor for a frequency channel indicates a number of times the frequency channel is repeated in the channel hopping sequence.

In one aspect, a method of generating a channel hopping sequence for a link of a wireless communication device in a wireless sensor network is provided that includes receiving a plurality of repetition factors for a plurality of respective frequency channels in the link, wherein a repetition factor for a frequency channel indicates a number of times the frequency channel is repeated in the channel hopping sequence, determining a set of frequency channels for generation of the channel hopping sequence based on the repetition factors, and generating the channel hopping sequence using the set of frequency channels.

In one aspect, a wireless communication device in a wireless sensor network is provided that includes a memory to store software instructions for generating a channel hopping sequence of a link of the wireless communication device that, when executed by a processor, cause the wireless communication device to receive repetition factors for a plurality of respective frequency channels of the link, wherein a repetition factor for a frequency channel indicates a number of times the frequency channel is repeated in the channel hopping sequence, determine a set of frequency channels for generation of the channel hopping sequence based on the repetition factors, and generate the channel hopping sequence using the set of frequency channels, and the processor coupled to the memory to execute the software instructions.

In one aspect, a monitoring system is provided that includes a memory to store software instructions that, when executed by a processor, cause the monitoring system to receive performance quality data for respective frequency channels of a plurality of frequency channel in a link in a wireless sensor network, determine a channel quality indicator (CQI) for each frequency channel based on the respective performance data, and determine a repetition factor for each frequency channel based on the respective CQI, wherein a repetition factor for a frequency channel indicates a number of times the frequency channel is repeated in a channel hopping sequence for the link, and the processor coupled to the memory to execute the software instructions.

In one aspect, a network is provided that includes a wireless sensor network, wherein nodes in the wireless sensor network operate according to a channel hopping sequence, and a monitoring system coupled to the wireless sensor network to receive performance quality data for respective frequency channels of a plurality of frequency channels in a link of a node, determine a channel quality indicator (CQI) for each frequency channel of based on the respective performance quality data, and determine a repetition factor for each frequency channel based on the respective CQI, wherein a repetition factor for a frequency channel indicates a number of times the frequency channel is repeated in a channel hopping sequence for the link used by the node.

DETAILED DESCRIPTION

Figures 1, 4:
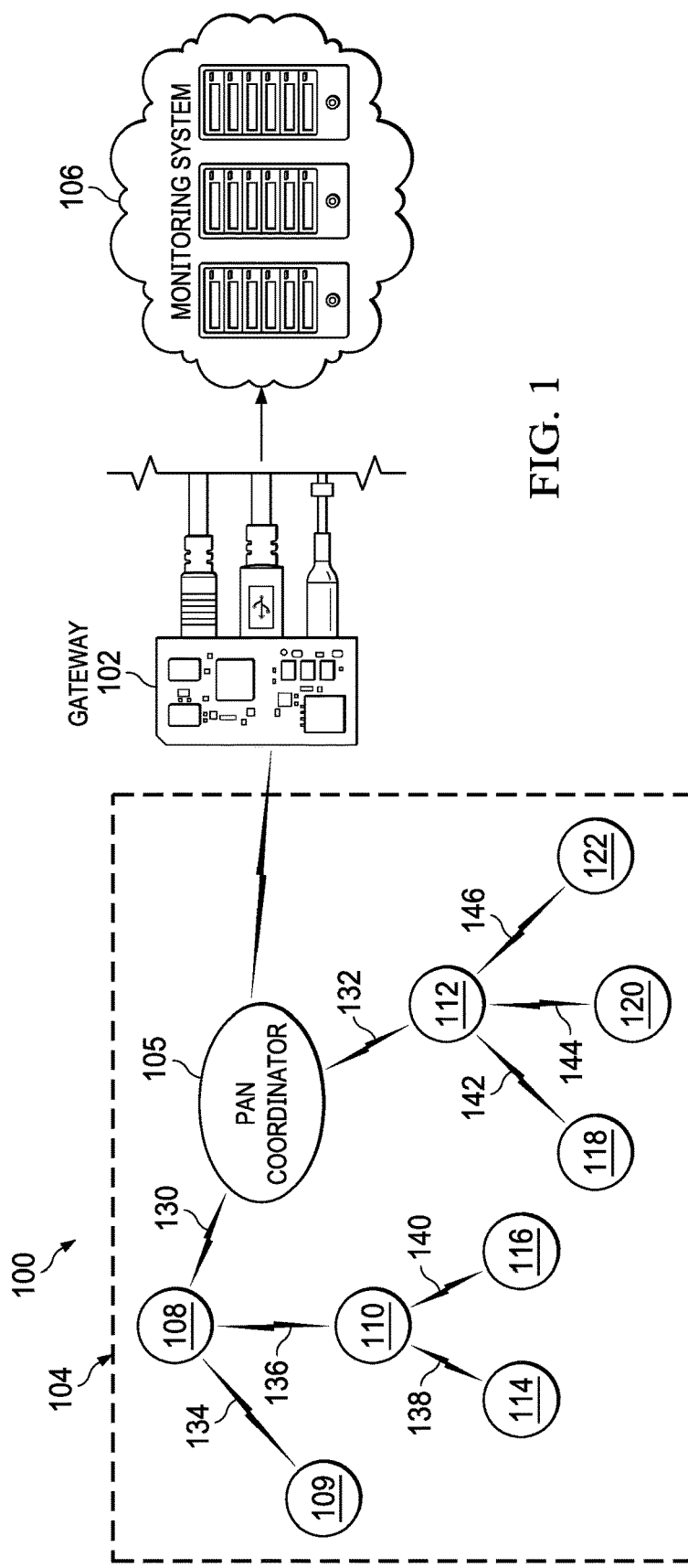
FIG. 1 is a simple example of a network including an industrial wireless sensor network (WSN) coupled to a monitoring system via a gateway.
FIG. 4 is an example illustrating portions of the method of FIG. 2.

Specific embodiments are now described in detail with reference to the accompanying figures. Like elements in the various figures are denoted by like reference numerals for consistency.

Embodiments provide for channel hopping over links in a wireless sensor network (WSN) based on performance statistics of the frequency channels used by the links. In some embodiments, real-time generation of a whitelist of channels for links in a WSN based on channel performance statistics of channels used in each link is provided, which also provides a blacklist of channels with unacceptable performance. In some embodiments, real-time formation of the channel hopping sequence for a link using the respective whitelist is provided.

Embodiments are explained herein in reference to "IEEE Standard for Low-Rate Wireless Personal Area Networks (WPANs)," The Institute of Electrical and Electronics Engineers, Inc., New York, N.Y., Apr. 22, 2016, which is incorporated by reference and referred to as "IEEE 802.15.4-2015" herein. Further, embodiments are based on timeslotted channel hopping (TSCH) as described in IEEE 802.15.4-2015. However, the concepts described herein are applicable to other time synchronized protocols such as, for example, WirelessHART, a wireless networking technology standard developed by the HART Communication Foundation, ISA 100.11a, a wireless networking technology standard developed by the International Society of Automation, and Bluetooth Low Energy.

FIG. 1 is a simple example of a network 100 including an industrial wireless sensor network (WSN) 104 coupled to a monitoring system 106 via a gateway 102. The example WSN 104 is arranged in a convergecast topology and includes a coordinator node 105 and nine nodes 108-122 coupled to the coordinator node 105. In a convergecast topology, packets from nodes are upwardly routed via respective parent nodes, if any, to the coordinator node. For example, the child node 118 transmits packets to the respective parent node 112 via link 142, which in turn forwards the packets from the child node 118 to the coordinator node 105.

A node 105-122 may be, for example, a control device such as a lock or a sensing device such as a smoke alarm or door sensor in an alarm system or may be both a control device and a sensing device such as a thermostat. In an industrial environment, example nodes include nodes used for temperature measurement, vibration monitoring, humidity monitoring, predictive maintenance, etc. The monitoring system 106 such as, for example, a server or other computer system, communicates with the coordinator node 105 in the WSN 104 via the gateway 102 to receive information from the nodes 108-122, e.g., sensor data and performance data, and to send information, e.g., control data, to the nodes 108-122. The link between the gateway 102 and the monitoring system 106 and between the coordinator node 105 and the gateway 102 can be wired or wireless.

Each of the nodes 105-122 includes a TSCH medium access (MAC) layer as defined in IEEE 802.15.4-2015. In a TSCH network, time is divided into slots for communication, and all intermediate and leaf nodes are time-synchronized to the root node. The time slots are grouped in slot frames and a TSCH schedule managed by another network layer instructs each node as to what the node should do in a given time slot: transmit, receive, or sleep. The schedule is a logical two-dimensional matrix with one dimension determining the slot offset in the slot frame and the other dimension designating the channel offset in the available frequency band. The width of the schedule is equal to the slot frame width and the depth is equal to the number of available frequency channels in the allotted band.

Further, a TSCH network uses channel hopping in which a particular MAC layer channel offset at the same time slot over successive slot frames in the schedule translates into a different frequency (or physical channel) at each iteration of the slot frame. The result is that successive packets exchanged over links between neighbor nodes are communicated at different frequencies. As is explained in more detail in reference to the method of FIG. 2, the monitoring system 106 determines the good channels in the links 130-146, i.e., the whitelists of channels with acceptable performance, that are used by the nodes 105-122 to generate the channel hopping sequences for respective links 130-146.

Figure 2:
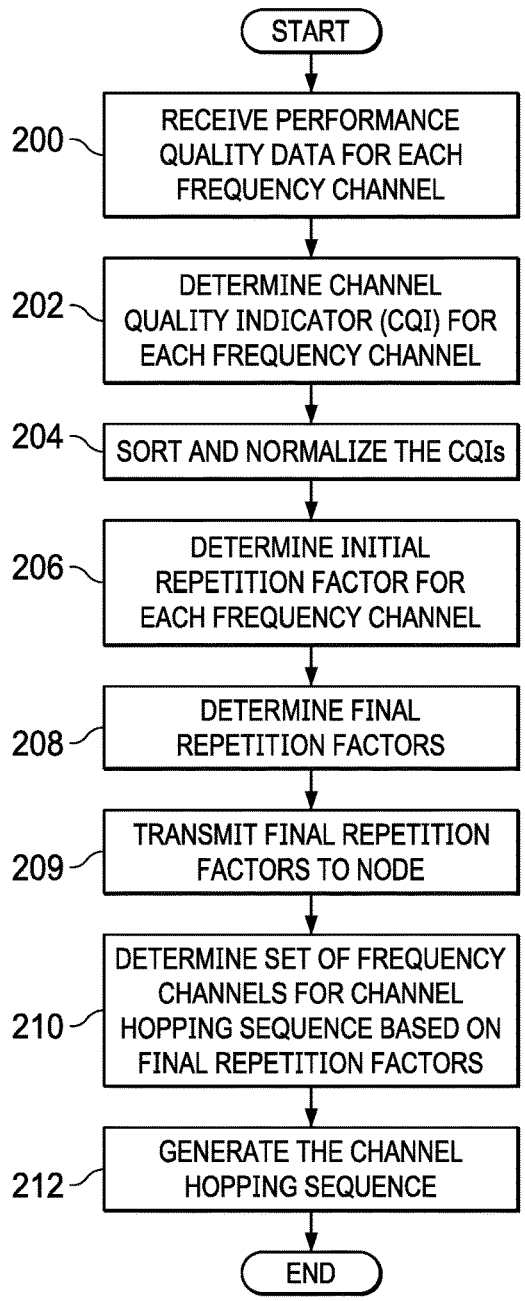
FIG. 2 is a flow diagram of a method for real-time determination of a channel hopping sequence for the WSN of FIG. 1 based on channel performance statistics.

As is explained in more detail in reference to the method of FIG. 2, each node 105-122 generates a channel hopping sequence for each link to a neighbor node using a whitelist of channels determined by the monitoring system 106 based on channel performance data for the link provided to the monitoring system 106 by the node. For example, the intermediate node 112 has four links, the link 142 to the child node 118, the link 144 to the child node 120, the link 146 to the child node 122, and the link 132 to the coordinator node 105. The intermediate node 112 provides channel performance data for each of these links to the monitoring system 106, receives a channel whitelist from the monitoring system 106 for each link, and uses each whitelist to generate a channel hopping sequence for the respective link. Each of the neighbor nodes 105, 118, 120, 122 also provide channel performance data to the monitoring system 106 for the respective link 132, 142, 144, 146 to the intermediate node 112, receive a channel whitelist from the monitoring system 106 for the respective link, and use the whitelist to generate a channel hopping sequence for the link.

FIG. 2 is a flow diagram of a method for real-time determination of a channel hopping sequence for a link 130-146 in the WSN 104 (FIG. 1) based on performance statistics of channels in the link used by a respective node 105-122. The method assumes that there are K frequency channels in the channel hopping sequences used in the WSN 104. For example, if the nodes 105-122 are communicating over respective links 130-146 using the 2.4 GHz band, K≤16. Initially, the monitoring system 106 receives 200 data representative of the performance quality of each frequency channel in use in the link and determines 202 a channel quality indicator (CQI) for each frequency channel used in the link based on the respective performance quality data. A CQI is a measure of the performance of each frequency channel, and can be, for example, channel impulse response, signal-to-noise ratio (SNR), packet error rate (PER), or bit error rate (BER).

The performance quality data needed to determine the CQIs can be collected either actively or passively by the nodes 105-122 in the WSN 104 and communicated to the monitoring system 106. For example, for active collection of PERs in the WSN 104, each node 105-122 in the WSN 104 can track the total number of attempted transmissions of packets per channel in respective links and the total number of successful transmissions of packets per channel during a specified performance data collection time interval. At the end of the time interval, the nodes 108-122 can compute the PER for each channel in respective links from the transmission statistics and send the PERs to the gateway 102 using an application packet. The gateway 102 can then communicate the PERs to the monitoring system 106. Note that a node can have links to one or more neighbor nodes and provides PERs for each link.

For passive collection of PERs in the WSN 104, node level PER computation is not needed. Because the WSN 104 is centrally controlled and follows a predetermined schedule, the gateway 102 can have complete knowledge of the packet transmission schedule for each node 108-122 including the channels used in respective links and the success or failure of each transmission. Based on the statistics of the packets successfully received by the coordinator node 105 over each channel from the nodes during a specified performance collection time interval, the gateway 102 can compute an estimate of the PER for each channel and communicate the PERs to the monitoring system 106.

For CQI candidates such as SNR, BER, and other metrics such as channel impulse response, passive data collection may not be feasible. For example, for active collection of SNRs for the frequency channels used in respective links, each node 105-122 can compute the average SNR per channel of each respective link over the specified performance data collection time interval and send the SNRs to the monitoring system 106.

Referring again to FIG. 2, the monitoring system 106 then sorts 202 the CQIs of the K frequency channels into a vector in descending order of CQI value where $CQI_{sort}[0], \ldots, CQI_{sort}[K-1]$ where $CQI_{sort}[0]$ is the frequency channel with the best performance quality. For example, if the CQIs are ones in which larger values indicate better performance quality, e.g., SNR or channel impulse response, $CQI_{sort}[0]$ is the largest value and $CQI_{sort}[K-1]$ is the smallest value. If the CQIs are ones in which smaller values indicate better performance quality, e.g., BER or PER, each CQI[K] is converted to 1−CQI[K] so that larger values indicate better performance quality. A vector of the channel indices for respective CQIs in the sorted CQI vector is also generated as per ChannelIndices=$[k_0\ k_1 \ldots k_{K-1}]$, where $CQI_{sort}[0]=CQI[k_0], \ldots, CQI_{sort}[K-1]=CQI[k_{K-1}]$.

The monitoring system 106 then normalizes 204 the CQIs in the sorted CQI vector by the best CQI value. Because the vector is sorted in descending order of performance quality, $CQI_{sort}[0]$ is the best CQI value. Thus, the normalization of each $CQI_{sort}[k]$ is given by $$CQI_{norm}[k]=CQI_{sort}[k]/CQI_{sort}[0].$$

The monitoring system 106 then determines 206 an initial repetition factor for each frequency channel based on the normalized CQI values. The initial repetition factor indicates how many times a frequency channel is to be included in the channel hopping sequence. The repetition factor for a channel k is computed as per $$R_f(k) = \text{floor}\left(\frac{K \times CQI_{norm}[k]}{\Sigma_j CQI_{norm}[j]}\right).$$

Due to the flooring operation, $\Sigma_j R_f(j) \leq K$.

The monitoring system 106 then determines 208 final repetition factors $R_f^{Final}(k)$ for the frequency channels such that $\Sigma_j R_f^{Final}(j)=K$. The final repetition factors for the frequency channels are determined as per the pseudo code of Table 1. To compute the final repetition factors, the pseudo code iterates through the repetition factors, incrementing each by one until the summation of all the repetition factors is equal to K. Note that if the summation of the initial repetition factors is equal to K, the initial repetition factors become the final repetition factors with no change. Any frequency channel having a non-zero final repetition factor is included in the whitelist and any frequency channel having a zero final repetition factor is included in the blacklist.

TABLE 1

```
R_f^{Final}(k) = R_f(k)
k = 0
while (Σ_j R_f^{Final} (j) < K)
        R_f^{Final}(k) = R_f^{Final}(k) + 1
    k = k + 1
    if (k == K)
        k = 0
```

The monitoring system 106 then transmits 209 the final repetition factors to the node that provided the performance data for the link. The receiving node needs to know which repetition factor corresponds to which channel in order to generate the channel hopping sequence for the link. In some embodiments, the monitoring system 106 transmits the final repetition factors in ascending channel number order so that the node can associate each repetition factor with the correct channel. In other embodiments, other techniques for communicating the channel information for each repetition factor can be used. The ChannelIndices vector is used to arrange the final repetition factors in ascending channel number order.

The node then determines 210 the set of frequency channels to be used to determine the final channel hopping sequence based on the final repetition factors. The final repetition factor for a frequency channel determines how many times the frequency channel is repeated in the set of channel indices use to generate the channel hopping sequence.

Figure 3:
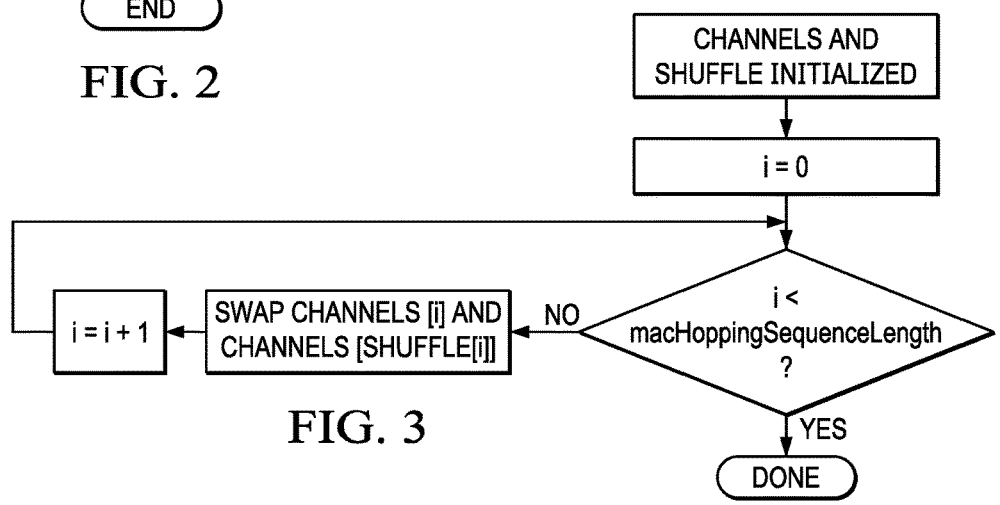
FIG. 3 is a flow diagram illustrating the generation of a channel hopping sequence as defined in IEEE 802.15.4-2015.

The node then generates 212 the final channel hopping sequence based on the set of channels and the algorithm for generating the channel hopping sequence defined by IEEE 802.15.4-2015. FIG. 3 is a flow diagram illustrating the generation of the final channel hopping sequence as defined in IEEE 802.15.4-2015. In this flow diagram, CHANNELS is the set of channels, macHoppingSequenceLength=K, and SHUFFLE is a vector of length macHoppingSequence-Length, the contents of which are equivalent to the first macHoppingSequenceLength outputs of a 9-bit linear feedback shift register (LFSR) with polynomial x9+x5+1 and a starting seed of 255. Each LFSR output is modulo macHoppingSequenceLength so that each entry of SHUFFLE is between 0 and (macHoppingSequenceLength−1) inclusive. Note that the channel hopping sequence generated as per the flow diagram is a random reordering of the channel list which increases the probability that the same channel is not used for two successive transmissions. Thus, the repetition factors indicate how many times a channel is repeated in the set of channels and how many times a channel is repeated in the channel hopping sequence.

The method of FIG. 2 is now illustrated assuming K=16 and assuming that the CQI for each channel is the channel impulse response. The channel responses for each of the 16 frequency channels of the link are shown in FIG. 4. The sorting and normalization of the channel responses for the 16 frequency channels in descending order of performance quality results in $CQI_{sort}$=[1.00 0.96 0.58 0.52 0.46 0.46 0.44 0.40 0.38 0.32 0.27 0.24 0.07 0.05 0.04 0.02]. Note that $CQI_{sort}[0]$=1.00 so $CQI_{norm}[k]=CQI_{sort}[k]$. The vector of channel indices ChannelIndices for respective entries in $CQI_{sort}$ is [8 7 1 0 2 5 6 4 15 10 3 11 14 9 13 12].

An initial repetition factor is determined for each frequency channel as previously described, resulting in the following vector of initial repetition factors: [2 2 1 1 1 1 1 0 0 0 0 0 0 0 0 0]. Final repetition factors are generated as previously described, resulting in the following vector of final repetition factors: [3 3 2 2 2 2 1 1 0 0 0 0 0 0 0 0]. Each entry in this vector indicates how many times the respective channel index in the vector of channel indices is to be repeated in the set of channels for generating the channel hopping sequence. The repetition factors are then sorted as per the ChannelIndices vector into ascending channel number order and transmitted to the node in ascending channel order, i.e., [2 2 2 0 1 2 1 3 3 0 0 0 0 0 0 0]. The set of channels to be used to generate the channel hopping sequence is then generated using the repetition factors: [0 0 1 1 2 2 4 5 5 6 7 7 7 8 8 8].

Figure 5:
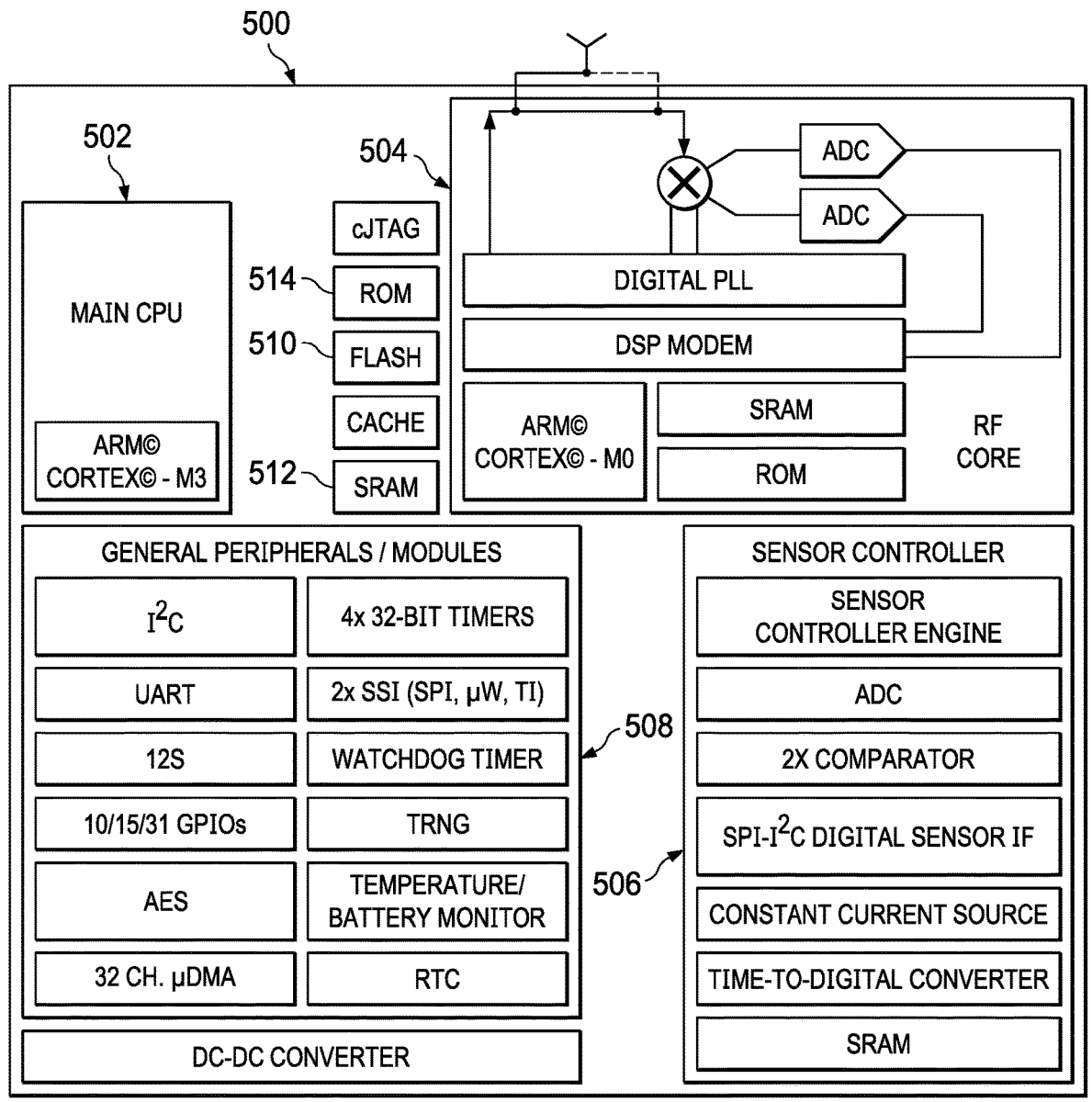
FIG. 5 is a simplified block diagram of an example wireless sensor device.

FIG. 5 is a simplified block diagram of an example wireless sensor device 500, e.g., a wireless communication device, that can be deployed as a node 105-122 in the example wireless network 104 of FIG. 1. More specifically, the example wireless sensor device 500 is a wireless microcontroller (MCU) as described in "CC2650 SimpleLink™ Multistandard Wireless MCU," SWRS158B, Texas Instruments, Inc., January 2015, revised July 2016, which is incorporated by reference herein.

The MCU 500 incorporates a main CPU 502 for executing applications and protocol software that is implemented as a 32-bit ARM® Cortex®-M3 processor. General peripherals/modules 508 on the MCU 500 include a 12-bit A/D converter, interfaces for SPI, Microwire, and UART protocols, internal direct memory access (DMA), a real-time clock, multiple 32-bit timers, and more. The sensor interface 506 incorporates a programmable sensor controller and peripherals for interfacing with analog or digital sensors.

The MCU 500 also incorporates a radio frequency (RF) core 504 that implements a 2.4 GHz RF transceiver compatible with multiple protocols including the Bluetooth 5 low energy protocol and the IEEE 802.15.4 protocol. The RF core 204 is designed to autonomously handle time critical aspects of transmitting and receiving various radio protocols. The RF core 504 includes a processor implemented as an ARM® Cortex®-MO processor for executing software that, e.g., interfaces the analog RF and base-band circuitry, handles data transmission to and from the main CPU 502, and assembles packets for transmission based on the protocol in use.

The MCU 500 also incorporates flash memory 510 that provides nonvolatile storage for code and data, static random access memory (SRAM) 512 that can be used for both storage of data and execution of code, and a read-only memory (ROM) 514 storing a real-time operating system kernel. Software instructions for the portions of the method of FIG. 2 performed by a node can be stored in a computer readable medium on the MCU 500 such as the flash memory 510, the SRAM 512, or the ROM 514 and executed by the main processor 502.

Figure 6:
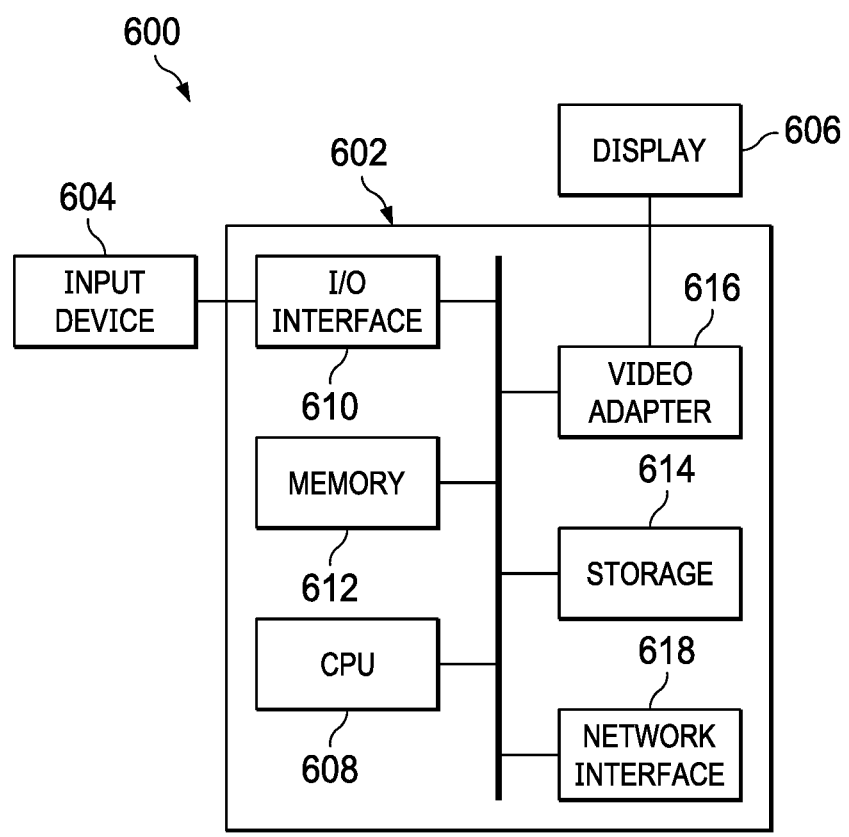
FIG. 6 is a simplified block diagram of a computer system.

FIG. 6 is a simplified block diagram of a computer system 600 that may be used as the monitoring system 106 in the network 100 of FIG. 1. The computer system 600 includes a processing unit 602 equipped with one or more input devices 604 (e.g., a mouse, a keyboard, or the like), and one or more output devices, such as a display 606. In some embodiments, the display 606 may be a touch screen, thus allowing the display 606 to also function as an input device. The processing unit 602 can be, for example, a server, a desktop computer, a workstation, a laptop computer, a dedicated unit customized for a particular application, or the like. The display 606 may be any suitable visual display unit such as, for example, a computer monitor, an LED, LCD, or plasma display, a television, or a high definition television.

The processing unit 602 includes a central processing unit (CPU) 608, memory 612, a storage device 616, a video adapter 612, an I/O interface 610, and a network interface 624 connected to a bus. The bus may be one or more of any type of several bus architectures including a memory bus or memory controller, a peripheral bus, video bus, etc.

The CPU 608 may be any type of processor. For example, the CPU 608 can be a processor from Intel Corp., a processor from Advanced Micro Devices, Inc., a Reduced Instruction Set Computer (RISC), an Application-Specific Integrated Circuit (ASIC), or a combination thereof. The memory 612 can be any type of system memory such as, for example, static random access memory (SRAM), dynamic random access memory (DRAM), synchronous DRAM (SDRAM), read-only memory (ROM), flash memory, or a combination thereof. Further, the memory 614 can include ROM for use at boot-up, and DRAM for data storage for use while executing programs.

The storage device 614, e.g., a computer readable medium, can include any type of storage device configured to store data, programs, and other information and to make the data, programs, and other information accessible via the bus. In one or more embodiments, the storage device 614 stores software instructions for the portions of the method of FIG. 2 performed by the monitoring system 106. The storage device 614 can be, for example, one or more of a hard disk drive, a magnetic disk drive, or an optical disk drive. The software instructions can be initially stored in a computer-readable medium such as a compact disc (CD), a diskette, a tape, a file, memory, or any other computer readable storage device and loaded and executed by the CPU 608. In some cases, the software instructions can also be sold in a computer program product, which includes the computer-readable medium and packaging materials for the computer-readable medium. In some cases, the software instructions can be distributed to the computer system 600 via removable computer readable media (e.g., floppy disk, optical disk, flash memory, USB key), via a transmission path from computer readable media on another computer system (e.g., a server), etc.

The video adapter 616 and the I/O interface 610 provide interfaces to couple external input and output devices to the processing unit 602. As illustrated in FIG. 6, examples of input and output devices include the display 606 coupled to the video adapter 616 and the input device 604 coupled to the I/O interface 610.

The network interface 618 allows the processing unit 602 to communicate with remote units via a network. For example, the network interface 614 allows the computer system 600 to communicate with the WSN 104 via the gateway 102. The network interface 618 can provide an interface for a wired link, such as an Ethernet cable, and/or a wireless link via, for example, a local area network (LAN), a wide area network (WAN) such as the Internet, a cellular network, or a combination thereof.

Other Embodiments

Those having benefit of the embodiment descriptions above will appreciate that other embodiments can be devised. For example, in some embodiments, rather than determining the final repetition factors as per the pseudo code of Table 1, the final repetition factors can be determined as per the pseudo code of Table 2. This pseudo code tends to repeat the better channels more by increasing a final repetition factor by the respective initial repetition factor rather than increasing each by 1 as in the previous pseudo code. The else statement is present to ensure that the sum of the final repetition factors cannot exceed K. If the addition of the initial repetition factor to the respective final repetition factor would cause the sum of the final repetition factors to exceed K, the final repetition factor is increased only by an amount that will cause the sum of the final repetition factors to equal K. For example, assume K=16 and a channel k for an iteration has an initial repetition factor $R_i(k)=4$. If the summation of the final repetition factors for all channels is 10, then $16-10-4 \geq 0$ and $R_i(k)=4$ is added to the final repetition factor of channel k. However, if the summation of the final repetition factors for all channels is 14, then $16-14-4<0$ and $16-14=2$ is added to the final repetition factor of channel k.

TABLE 2

$R_f^{Final}(k) = R_f(k)$
$k = 0$
while $(\Sigma_j R_f^{Final}(j) < K)$
   if $(K - \Sigma_j R_f^{Final}(j) - R_f(k) \geq 0)$
      $R_f^{Final}(k) = R_f^{Final}(k) + R_f(k)$
   else
      $R_f^{Final}(k) = R_f^{Final}(k) + K - \Sigma_j R_f^{Final}(j)$
   $k = k + 1$
   if $(k == K)$
      $k = 0$ In another example, embodiments are described herein in which the WSN is a network of sensors in an industrial application. Other application environments that may benefit from real-time determination of a channel hopping sequence based on channel statistics include home automation, medical device monitoring, temperature monitoring, and building security systems, agriculture (e.g., predicting a frost event based on sensor data) or an in-vehicular network.

In another example, embodiments are described herein in which the CQIs are sorted in descending order of performance quality and normalized. In other embodiments, the sorting is in ascending order. Further, in some embodiments, the CQIs are normalized before sorting. And, in some embodiments, no normalization is performed.

In another example, embodiments are described herein in which the set of frequency channels and the channel hopping sequence are generated by a node based on repetition factors provided by the monitoring system 106. In other embodiments, the monitoring system 106 can generate the set of frequency channels and transmit those to the node for generation of the channel hopping sequence. In other embodiments, the monitoring system 106 can generate both the set of frequency channels and the channel hopping sequence and transmit the channel hopping sequence to the node. In these other embodiments, the monitoring system 106 can generate the set of frequency channels using the ChannelIndices vector as per $$\text{ChannelList} = [k_0 \ldots k_0 k_1 \ldots k_1 \ldots k_{K_f} \ldots k_{K_f}],$$

where $K_f = \{k \leq K-1 : R_f^{final}(k) > 0 \text{ and } R_f^{final}(K_f+1) = 0\}$, i.e., $K_f$ is the index of the last frequency channel with a non-zero final repetition factor. In other embodiments, the monitoring system 106 can send both the vector of final repetition factors and the ChannelIndices vector to the node and the node can use both to generate the set of frequency channels.

Modifications are possible in the described embodiments, and other embodiments are possible, within the scope of the claims.

What is claimed is:

1. A method of generating a channel hopping sequence for a link in a wireless sensor network, the method comprising:
   receiving performance quality data for respective frequency channels of a plurality of frequency channels in the link in a monitoring system;
   determining a channel quality indicator (CQI) by the monitoring system for each frequency channel based on the respective performance quality data; and
   determining a repetition factor by the monitoring system for each frequency channel based on the respective CQI, wherein a repetition factor for a frequency channel indicates a number of times the frequency channel is repeated in the channel hopping sequence.

2. The method of claim 1, further comprising:
   determining a set of frequency channels for generation of the channel hopping sequence based on the repetition factors.

3. The method of claim 2, further comprising:
   generating the channel hopping sequence using the set of frequency channels.

4. The method of claim 1, wherein determining a repetition factor further comprises;
   determining the repetition factor for a frequency channel as per $$R_f(k) = \text{floor}\left(\frac{K \times CQI[k]}{\Sigma_j CQI[j]}\right),$$

wherein K is a number of channels in the plurality of frequency channels, CQI[k] is the CQI for a frequency channel k of the plurality of frequency channels, and CQI[j] is the CQI for a frequency channel j of the plurality of frequency channels.

5. The method of claim 4, wherein determining a repetition factor by the monitoring system for each frequency channel further comprises:
   modifying repetition factors in turn in descending numerical order while a sum of the repetition factors is less than a number of frequency channels in the channel hopping sequence.

6. The method of claim 5, wherein modifying repetition factors further comprises adding one to a largest repetition factor.

7. The method of claim 5, wherein modifying repetition factors further comprises adding an initial value of a largest repetition factor to the largest repetition factor.

8. A method of generating a channel hopping sequence for a link of a wireless communication device in a wireless sensor network, the method comprising:
   receiving a plurality of repetition factors for a plurality of respective frequency channels in the link, wherein a repetition factor for a frequency channel indicates a number of times the frequency channel is repeated in the channel hopping sequence;
   determining a set of frequency channels for generation of the channel hopping sequence based on the repetition factors; and
   generating the channel hopping sequence using the set of frequency channels.

9. The method of claim 8, wherein the plurality of repetition factors is generated by:
   determining a channel quality indicator (CQI) for each frequency channel of the plurality of frequency channels; and
   determining the repetition factor for each frequency channel based on the respective CQI.

10. The method of claim 9, wherein determining the channel quality indicators and determining the repetition factors are performed by a monitoring system coupled to the wireless sensor network.

11. A wireless communication device in a wireless sensor network, the wireless communication device comprising:
   a memory to store software instructions for generating a channel hopping sequence of a link of the wireless communication device that, when executed by a processor, cause the wireless communication device to:
      receive repetition factors for a plurality of respective frequency channels of the link, wherein a repetition factor for a frequency channel indicates a number of times the frequency channel is repeated in the channel hopping sequence;

determine a set of frequency channels for generation of the channel hopping sequence based on the repetition factors; and generate the channel hopping sequence using the set of frequency channels; and the processor coupled to the memory to execute the software instructions.

12. The wireless communication device of claim 11, wherein a repetition factor for a frequency channel is determined based on a channel quality indicator (CQI) computed for the frequency channel.

13. The wireless communication device of claim 11, wherein the repetition factors are determined by a monitoring system coupled to the wireless sensor network.

14. A monitoring system comprising:
a memory to store software instructions that, when executed by a processor, cause the monitoring system to:
receive performance quality data for respective frequency channels of a plurality of frequency channel in a link in a wireless sensor network;
determine a channel quality indicator (CQI) for each frequency channel based on the respective performance data; and
determine a repetition factor for each frequency channel based on the respective CQI, wherein a repetition factor for a frequency channel indicates a number of times the frequency channel is repeated in a channel hopping sequence for the link; and
the processor coupled to the memory to execute the software instructions.

15. The monitoring system of claim 14, wherein software instructions to determine a repetition factor further comprise software instructions to:
determine the repetition factor for a frequency channel as per $$R_f(k) = \text{floor}\left(\frac{K \times CQI[k]}{\Sigma_j CQI[j]}\right),$$

wherein K is a number of channels in the plurality of frequency channels, CQI[k] is the CQI for a frequency channel k of the plurality of frequency channels, and CQI[j] is the CQI for a frequency channel j of the plurality of frequency channels.

16. The monitoring system of claim 15, wherein software instructions to determine a repetition factor for each frequency channel further comprise software instructions to:
modify the repetition factors in turn in descending numerical order while a sum of the repetition factors is less than a number of frequency channels in the channel hopping sequence.

17. The monitoring system of claim 16, wherein software instructions to modify repetition factors further comprise software instructions to add one to a largest repetition factor.

18. The monitoring system of claim 16, wherein software instructions to modify repetition factors further comprise software instructions to add an initial value of a largest repetition factor to the largest repetition factor.

19. A network comprising:
a wireless sensor network, wherein nodes in the wireless sensor network operate according to a channel hopping sequence; and
a monitoring system coupled to the wireless sensor network to:
receive performance quality data for respective frequency channels of a plurality of frequency channels in a link of a node;
determine a channel quality indicator (CQI) for each frequency channel of based on the respective performance quality data; and
determine a repetition factor for each frequency channel based on the respective CQI, wherein a repetition factor for a frequency channel indicates a number of times the frequency channel is repeated in a channel hopping sequence for the link used by the node.

20. The network of claim 19, where the repetition factors are used to determine a set of frequency channels for generation of the channel hopping sequence and the set of frequency channels is used to generate the channel hopping sequence.

* * * * *